Jan. 7, 1941.                D. DALIN                2,227,634
METHOD OF AND APPARATUS FOR CONDITIONING GRAIN
Filed April 17, 1937
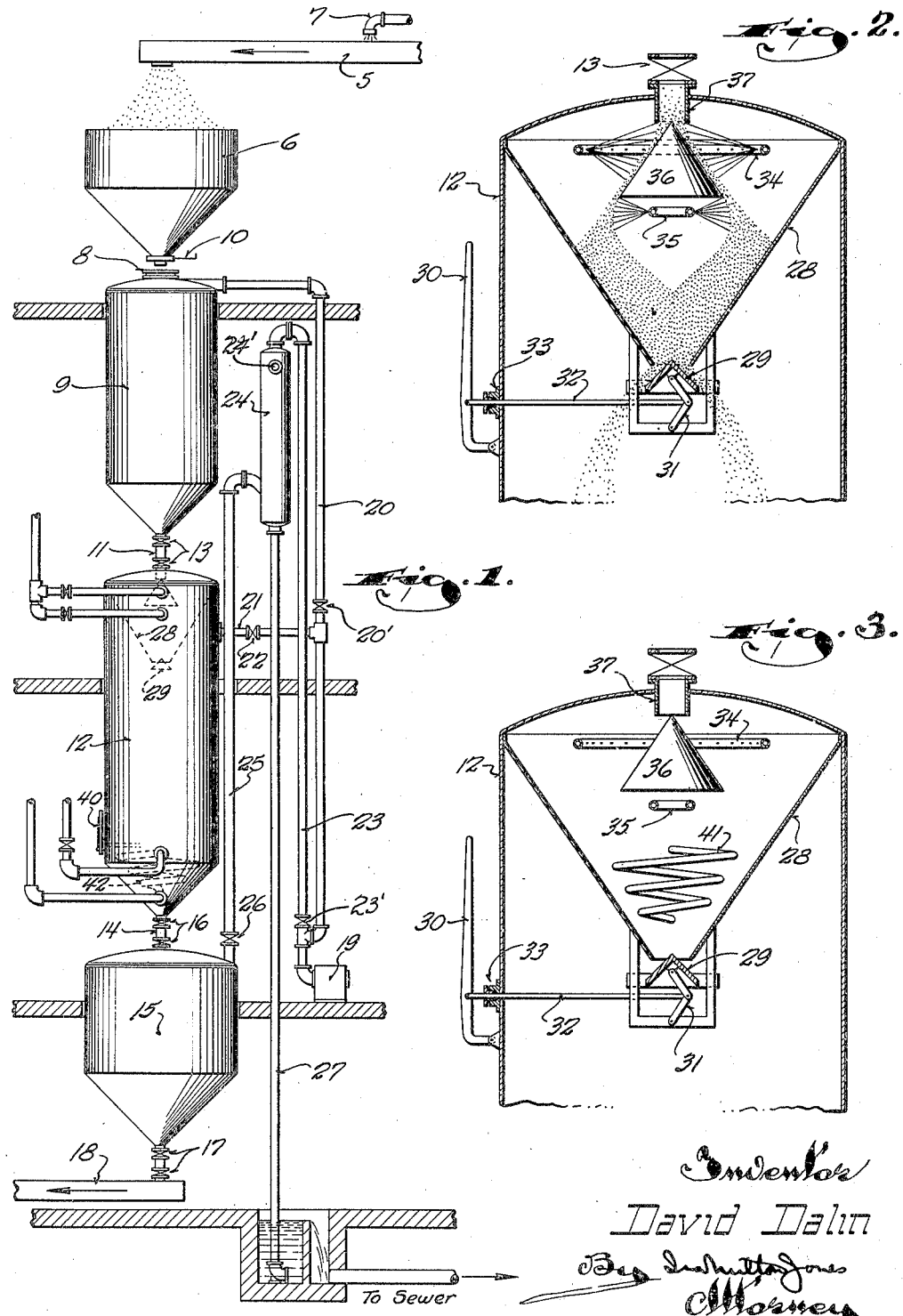

Patented Jan. 7, 1941

2,227,634

UNITED STATES PATENT OFFICE 2,227,634

METHOD OF AND APPARATUS FOR CONDITIONING GRAIN

David Dalin, Milwaukee, Wis.

Application April 17, 1937, Serial No. 137,423

13 Claims. (Cl. 83—28)

This invention relates to the conditioning of grain and the like and refers particularly to an improved method and apparatus for subjecting the material being treated to a controlled heat and moisture treatment.

As is well known to those skilled in this art, grain as it is taken from elevators and other places of storage, is generally much too dry for milling and processing purposes. It is therefore necessary to raise its moisture content, which is generally referred to as conditioning the grain.

Much depends upon this conditioning of the grain; and good results require absolute uniformity in the moisture content, not only of all portions of the mass, but throughout the entire structure of the individual kernels as well. The attainment of this optimum condition has always been a problem to the industry, and until the advent of the Jonsson Patent No. 2,035,893, even an approximation of uniformity entailed holding the grain in tanks for long periods after being wetted.

Substantial improvement resulted from the use of vacuum (or near vacuum) as taught in the Jonsson patent, but even this did not completely solve the problem, and it is to further improvement of this method of conditioning grain and the like that this invention is directed.

It is particularly an object of this invention to so utilize heat and vacuum or subpressures as to bring about a more rapid, complete and uniform penetration of moisture into the body of the individual kernels or particles of the material being treated.

To this end, the invention contemplates the subjection of the material to steam pressure but below atmospheric pressure so that the temperatures involved are not harmful to the material, especially grain.

Another object of this invention is to provide a simple apparatus for conducting this improved method.

It is a further object of the invention to provide an apparatus whereby all portions of the material are subjected to a fluid heating medium as it enters an evacuated treating chamber.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates two complete examples of the physical embodiment of the invention constructed according to the best modes so far devised for the practical application of the principles thereof, and in which:

Figure 1 is a side elevational view of an apparatus constructed in accordance with this invention, parts thereof being shown diagrammatically;

Figure 2 is an enlarged vertical sectional view through the upper portion of the heat treating chamber to illustrate structural details; and Figure 3 is a view similar to Figure 2, illustrating a slightly modified embodiment of this portion of the invention.

Referring now particularly to the accompanying drawing in which like numerals indicate like parts throughout the several views, the numeral 5 designates a conveyer by which the material to be treated is conducted to a garner 6. Disposed above the conveyer is a water spray 7 to moisten the material in its passage to the garner.

The garner 6 has its outlet arranged to discharge into the inlet 8 of an upright tank 9, the outlet of the garner being controlled by a gate or slide valve 10. The outlet of the tank 9 is connected as at 11 with the inlet of a tank 12 disposed directly beneath the tank 9. Two valves 13 arranged in the connection 11 provide means for completely closing off one tank from the other.

The tank 12, as will be hereinafter more fully described, constitutes the treating chamber in which the material to be treated is held at subpressures for a predetermined length of time under definite and controlled temperature and moisture conditions. The outlet of the tank 12 is connected through a duct 14 with the inlet of a cooling chamber or tank 15, valves 16 being provided in the connection 14 to provide for shunting off the tank 12 from the tank 15. The outlet of the cooling tank 15 is controlled by valves 17 and leads to a conveyer 18 by which the treated material is conveyed to the processing machinery of the plant (not shown) or any other desired destination.

The entire conditioning treatment of the material is conducted under vacuum or sub-atmospheric pressure and to this end, a vacuum pump 19, or other suitable means of evacuating the tanks is provided. The pump is connected with the upper tank 9 by means of a pipe-line 20 provided with a valve 20', and is connected with the tank 12 through a branch 21 of the pipe-line 20, separately controlled by a valve 22, so that the tanks 9 and 12 may be evacuated independently.

The vacuum pump is also connected by means of a pipe-line 23 provided with a control valve 23' to a condenser 24 which is connected with the cooling tank 15 through a pipe-line 25, a valve 26 being provided in the line 25. Cold water from a suitable source enters the condenser through an inlet indicated at 24', and the condensate from the condenser 24 is discharged through a drain pipe 27.

Arranged in the upper part of the tank 12 is a funnel 28 providing a receiving compartment into which the material entering the tank 12 is initially admitted. At the bottom of this funnel is a conical gate 29 arranged to move vertically toward and from the mouth of the funnel to control the rate of flow of material therefrom. This gate or valve 29 is manually controllable from the exterior of the tank 12 by means of a lever 30 which is linked to a toggle 31 by means of a connecting rod 32, the rod 32 passing through a packing gland 33 in the wall of the tank 12.

As will be readily apparent, actuation of the lever 30 will cause the gate or valve 29 to move vertically toward and from the mouth of the funnel 28.

Disposed within the receiving compartment formed by the funnel 28 are two steam coils 34 and 35, the former being located above the latter and being of greater diameter. Jet openings are formed on the inner periphery of the upper coil 34 and on the outer periphery of the lower coil 35 so that steam or hot water may be projected inwardly from the upper coil and outwardly from the lower coil.

Between the two coils is a conical distributor 36, the apex of which is adjacent to the inlet of the tank which may have a downwardly extending skirt 37 terminating directly above the distributor. With this arrangement, the material entering the inlet of the tank is caused to flow in a thin layer down the sides of the distributor 36, during which time the jets of heating fluid issuing from the coil 34 impinge the outer surface of the layer, and as the material falls in a curtain from the base of the distributor, the jets issuing from the lower coil 35 impinge the inner wall of the thin layer. Consequently, all portions of the material are subjected to the fluid heating medium as it enters the receiving compartment formed by the funnel 28.

*Operation*

The material collected in the garner 6 having been moistened, as described, is discharged in batches through the slide valve 10 into the upper tank 9. Prior to the admission of the material into the tank 9, the valves 13 have been tightly closed, and during the admission of material into the tank 9, the tanks 12 and 15 are evacuated to a predetermined degree of subpressure. After the tank 9 is filled, its cover is tightly closed, and then valve 20' is opened to evacuate the tank 9 to the same degree of subpressure. During the evacuation of the tank 9, the valve 22 is closed.

With the evacuation of the tank 9, the individual kernels of the material comprising it, undergo a change. It may be said that their cell structures become evacuated and relaxed.

The valves 13 are then opened and the material flows down into the tank 12, the valves 16 at the bottom of the tank 12 having been first closed. Upon its admission into the tank 12, the material flows over the distributor 36 in the manner described, and at this point the fluid heating medium, which as stated, may be either steam or hot water, is applied directly to the material. During this application of heating fluid, some of the steam condenses on the material, and the whole tank 12 and particularly its receiving compartment provided by the funnel 28 fills with low pressure steam.

It is to be observed that in view of the higher temperature which obtains in the receiving compartment by virtue of the injection of heating fluid into it, a slightly higher pressure is established in the tank 12, and especially in the receiving compartment. This slight increase in pressure (although still considerably below atmospheric) accelerates the penetration of the moisture into the heart of the kernels or particles. This follows from the fact that the individual particles of the material, having been subjected to the lower subpressure in the upper tank 9, have their inner structures substantially evacuated and relaxed so that when subjected to the slight pressure increase which results from the application of heat, the vapors are driven into the body of the kernels or particles.

The rate of flow of the material through the receiving compartment depends upon the ultimate temperature desired in the material.

After all of the material has been admitted to the tank 12, the valves 13 are tightly closed and the heating fluid turned off. In some instances though where the material was exceptionally deficient in moisture, it may be desirable to leave the heating fluid turned on for a short while after the closing of the valves 13. In any event the material is allowed to remain in te the tank 12 for a sufficient length of time to insure penetration of the water vapors into the interior of the particles comprising the mass being treated, but this period is comparatively short in view of the effective penetration of moisture brought about by the slightly increased pressure in the tank 12.

The vapors are gradually absorbed by the material so that a uniform degree of moisture and temperature obtains throughout the whole mass of material. While this conditioning period is progressing, the temperature within the mass of material can be determined by means of a thermometer 49, the antenna of which extends into the interior of the tank 12, and if desired, a sampling device (not shown) may be provided for withdrawing samples of the material without breaking into the vacuum.

When the material has attained the proper condition, the valves 16 are opened, whereupon the material flows into the previously evacuated tank 15, and as soon as the tank 12 is empty, the valves 16 are again tightly closed and valve 26 is opened. With the opening of the valve 26, the tank 15 is communicated with the condenser 24 and any excess moisture allowed to vaporize is drawn off. This, of course, effects a reduction in the temperature of the material.

It has been found that with this apparatus, the final temperature and moisture of the finished product can be closely predetermined through accurate control of the initial moisture, the temperature and the subpressure (vacuum) in the tanks, as the heat in the material mass will vaporize only a certain amount of water before the temperature is reduced to a degree corresponding with the temperature of water vaporization at the prevailing subpressure (vacuum) after which no further evaporation will take place unless additional heat is supplied.

Under certain circumstances it may be necessary to provide additional heat for drying, and to this end heating coils 41 may be arranged within the receiving compartment of the tank 12 as illustrated in Figure 3. While, as noted hereinbefore, it is essential that the material have a predetermined percentage of moisture content which is generally in excess of that contained by the material as it is taken from elevators and other places of storage, there are instances when the material is too moist and it is in such cases that the drying coils 41 would be used. When these coils are used, they act on the material as it enters the tank 12.

Where moisture must be added, it is usually possible to accurately control and predetermine the final condition of the material, but there may be times when the material, after the conditioning period, contains an excess of moisture. This condition, from the standpoint of proper milling and processing, is worse than too little moisture; and consequently, it is desirable to provide means for drying the material at this stage in the operation. This object is attained though the provision of heating coils 42 located at the bottom of the tank 12 to be used as the material is discharged from the tank.

After the treatment of the material in the cooling tank 15 is completed, the valves 17 at the bottom of the tank are opened and the material is discharged through the conveyer 18 to the processing machinery of the plant (not shown).

When the tank 15 is empty, the valves 17 are again closed and the air and vapors are evacuated through the condenser 24 and the vacuum pump 19. The tank 15 is thus made ready to receive another batch of material, which in the meantime, has undergone treatment in the tanks 9 and 12. The operation is thus substantially a continuous one.

In certain instances, it may not be necessary to add moisture to the material. In such cases this invention provides for uniformly dispersing the moisture content of the material. To illustrate—parts of the material may have a moisture content of ten per cent while others may contain as much as eighteen per cent of moisture. By applying only heat to the material while it is confined in the tank 12 under vacuum, evaporation of the moisture content takes place, and as the moisture of the material particles containing the greater percentage evaporates more rapidly than that of the lesser, an equalization takes place. The pressure is also increased by this evaporation so that this equalization is materially hastened by the increased pressure causing the vapor to penetrate into the material particles containing the lesser percentage of moisture.

From the foregoing description taken in connection with the accompanying drawing, it will be readily apparent to those skilled in the art, that this invention provides a substantial improvement in the method and apparatus for conditioning grain, and that it enables more accurate determination of the final temperature and moisture conditions of the material than has heretofore been possible.

What I claim as my invention is:

1. In a grain conditioning apparatus of the character described, the combination of: two superimposed tanks; a controlled connection between the tanks through which material to be treated may gravitate from the upper tank into the lower tank; means for evacuating the tanks while the material is in the upper tank and the lower tank is empty; means at the top of the lower tank for defining a treatment zone having a restricted outlet at its bottom; means for spreading the material into a thin layer as it gravitates from the upper tank down into the treatment zone; means for projecting steam onto the thin layer of material as it enters the treatment zone so that all portions of the material are subjected to a heat and moisture treatment and moisture is driven into the interstices of the material by the increase in pressure incident to the introduction of the steam into the evacuated treatment zone; and valve means for controlling the rate of discharge of the material from the treatment zone to coordinate the same with its rate of flow from the upper tank into the treatment zone so that the material is detained for a period of time in the treatment zone before entering the main part of the lower tank.

2. In a grain conditioning apparatus of the character described, the combination of: two superimposed tanks; a controlled connection between the tanks through which material to be treated may gravitate from the upper tank into the lower tank; means for evacuating the tanks while the material is in the upper tank and the lower tank is empty; means at the top of the lower tank for defining a treatment zone having a restricted outlet at its bottom; means for spreading the material into a thin layer as it gravitates from the upper tank down into the treatment zone; means for projecting steam onto the thin layer of material as it enters the treatment zone so that all portions of the material are subjected to a heat and moisture treatment and moisture is driven into the interstices of the material by the increase in pressure incident to the introduction of the steam into the evacuated treatment zone; valve means for controlling the rate of discharge of the material from the treatment zone to coordinate the same with its rate of flow from the upper tank into the treatment zone so that the material is detained for a period of time in the treatment zone before entering the main part of the lower tank; and heating means in the lower portion of the treatment zone past which the material flows as it discharges from the treatment zone.

3. In a grain conditioning apparatus of the character described, the combination of: two superimposed tanks; a controlled connection between the tanks through which material to be treated may gravitate from the upper tank into the lower tank; means for evacuating the tanks while the material is in the upper tank and the lower tank is empty; means at the top of the lower tank for defining a treatment zone having a restricted outlet at its bottom; means for spreading the material into a thin layer as it gravitates from the upper tank down into the treatment zone; means for projecting steam onto the thin layer of material as it enters the treatment zone so that all portions of the material are subjected to a heat and moisture treatment and moisture is driven into the interstices of the material by the increase in pressure incident to the introduction of the steam into the evacuated treatment zone; valve means for controlling the rate of discharge of the material from the treatment zone to coordinate the same with its rate of flow from the upper tank into the treatment zone so that the material is detained for a period of time in the treatment zone before entering the main part of the lower tank; means at the bottom of the lower tank for discharging the contents thereof; and heating means adjacent the lower portion of the lower tank for heating the material as it discharges therefrom.

4. An apparatus for conditioning grain comprising: three superimposed tanks; means for evacuating all of said tanks; means for conducting material from the upper tank to the middle tank and from the middle tank to the lowermost tank without admitting air to the material or the tanks so that material which has had its cell structure relaxed by evacuation in the upper tank may flow into the middle tank while in such relaxed condition; means for causing the material passing from the upper tank into the middle tank to flow in a thin layer; means for projecting steam against said thin layer of material to uniformly moisten the same and by the increase in pressure effected by the steam, drive the moisture into the relaxed cell structure of the material; a condenser; controllable means providing the sole connection between the lowermost tank and the vacuum source, said means including the condenser so that communication between the lowermost tank and the vacuum source is through the condenser; and means for heating the material as it flows from the middle tank into the lowermost tank whereby surplus moisture may be removed through the coaction of the vaporization effected by the heating and the action of the condenser.

5. The hereindescribed method of conditioning grain and like materials which comprises: depositing the material in a tank; evacuating said tank and the material in it and another empty tank to the same degree of subpressure; transferring the material into the empty tank without admitting air into either tank; and projecting steam into the empty tank and against the incoming materials during said transfer of the material so that the pressure in said empty tank is slightly above that of the evacuated material whereby moisture supplied by the steam is driven into the interior of the individual particles of material.

6. The hereindescribed method of conditioning grain and like materials which comprises: depositing the material in a tank; evacuating the tank and the material in it to a predetermined degree of subpressure so that the cell structure of the individual particles of the material is relaxed; transferring the material into one compartment of a multiple compartment tank entirely evacuated to the same degree of subpressure without admitting air to either tank; and filling said compartment of the receiving tank with steam which supplies moisture and a slight pressure in comparison to the low internal pressure of the individual particles of the material and drives the moisture into the interior of the individual particles, and retarding the flow of the material through said compartment of the receiving tank so as to insure all portions thereof being subjected to the effect of the steam.

7. The hereindescribed method of conditioning grain and like materials which comprises: subjecting the material to a predetermined high degree of vacuum while contained within a suitable container so as to relax and evacuate the internal structure of its individual particles; allowing the material to flow by gravity into a treatment zone forming part of a larger receptacle, the entirety of which including the treatment zone has been previously evacuated to the same degree of vacuum as that which obtains in the container; causing the material to assume a thin layer as it enters the treatment zone; projecting steam onto the thin layer of material so that all parts of the material are subjected to the effect of the heat and moisture of the steam and the moisture is driven into the interstices of the particles by the increase in pressure incident to the introduction of the steam into the treatment zone; and controlling the discharge of the material from the treatment zone into the main part of the receptacle so that the material is retained in the treatment zone for a period of time sufficient to insure thorough penetration of the moisture into the internal structure of the individual particles.

8. The hereindescribed method of conditioning grain and like materials which comprises: placing the material to be treated in the upper one of two superimposed vessels shut off from each other; evacuating both vessels to the same degree of vacuum so that the internal structure of the individual particles of the material in the upper vessel is relaxed and evacuated; closing off both vessels from the vacuum producing means; allowing the material to gravitate into the lower vessel; causing the material to assume a thin layer as it enters the lower vessel; and projecting steam onto the thin layer of material entering the lower vessel so that all parts of the material are subjected to the effect of heat and moisture of the steam and the moisture is driven into the interstices of the particles by the increase in pressure incident to the introduction of steam into the evacuated lower vessel.

9. The hereindescribed method of conditioning grain and like materials, which comprises: placing the material to be treated in the upper one of two superimposed vessels shut off from each other; evacuating both vessels to the same degree of vacuum so that the internal structure of the individual particles of the material in the upper vessel is relaxed and evacuated; closing off both vessels from the vacuum producing means; allowing the material to gravitate into the lower vessel; causing the material to assume a thin layer as it enters the lower vessel; and subjecting the thin layer of material entering the lower vessel to moist heat so that all parts of the material are uniformly heated and moistened to cause moisture on the surface thereof to vaporize and be driven into the interstices of the particles by the increase in pressure incident to the introduction and development of vapor in the lower vessel by the application of the moist heat to the falling thin layer of material.

10. The hereindescribed method of conditioning grain and like materials, which comprises: subjecting the material to a predetermined high degree of vacuum while contained within a suitable container so as to relax and evacuate the internal structure of its individual particles; allowing the material to flow by gravity into a similarly evacuated treatment zone which has a restricted connection with a holding receptacle also evacuated to the same extent; causing the material to assume a thin layer as it enters the treatment zone; projecting steam onto the thin layer of material so that all parts of the material are subjected to the effect of the heat and moisture of the steam and the moisture is driven into the interstices of the particles by the increase in pressure incident to the introduction of steam into the treatment zone; allowing the material to flow from the treatment zone into the holding receptacle to carry moisture and heat with it; and retaining the material in the holding receptacle long enough to insure complete and uniform dispersion of the moisture throughout the entire mass of material.

11. The hereindescribed method of conditioning grain and like materials, which comprises: placing the material to be treated in an elevated vessel; evacuating the vessel to a high degree of vacuum so that the internal structure of the individual particles of the material is relaxed and evacuated; simultaneously evacuating a receptacle which forms a treatment zone directly beneath said vessel and a holding receptacle which has a restricted connection with the treatment zone, to the same degree of vacuum; closing off the elevated vessel, the treatment zone and the holding receptacle from the vacuum producing means; allowing the material to gravitate from the elevated vessel into the treatment zone; causing the material to assume a thin layer as it enters the treatment zone; projecting steam onto the thin layer of material so that all parts of the material are subjected to the effect of the heat and moisture of the steam and the moisture is driven into the interstices of the particles by the increase in pressure incident to the introduction of steam into the treatment zone; allowing the material to flow from the treatment zone into the holding receptacle and carry moisture and heat with it; and retaining the material in the holding receptacle for a period of time sufficient to insure uniform and thorough dispersion of the moisture throughout the entire mass of material.

12. The hereindescribed method of conditioning grain and like materials, which comprises: depositing the material in the upper one of three superimposed receptacles while it is shut off from the two lower receptacles; evacuating all of the receptacles while the material is in the upper one to the same degree of vacuum so that the internal structure of the individual particles of the material is relaxed; shutting off the receptacles from the vacuum producing means; allowing the material to flow into the middle receptacle, and from the middle receptacle into the lower one at such rates as to detain the material a short time in the middle receptacle; filling the middle receptacle with steam which supplies moisture and heat to the material and increases the pressure within the middle receptacle to drive the moisture into the interior of the individual particles of material; and heating the material as it flows from the middle receptacle into the lower one to a temperature above that imparted to it by the steam so as to vaporize moisture carried on the outside of the particles and cause it to penetrate the particles and effect more uniform dispersion of the moisture through the material.

13. The hereindescribed method of conditioning grain and like materials, which comprises: depositing the material in a tank; evacuating said tank and the material in it and another empty tank to the same degree of subpressure; shutting off the tanks from the vacuum producing means; transferring the material into the empty tank without admitting air into either tank; projecting steam into the empty tank and against the incoming material during said transfer of the material so that the pressure in said empty tank is slightly above that of the evacuated material, whereby moisture supplied by the steam is driven into the interior of the individual particles of material; transferring the steam treated material into another previously evacuated tank; and cooling the material while in said last named tank by drawing off vapor from the material through suitable vacuum producing means connected with said last named tank.

DAVID DALIN.